US008376749B2

(12) United States Patent
Lowry

(10) Patent No.: US 8,376,749 B2
(45) Date of Patent: Feb. 19, 2013

(54) MILESTONE MANAGER

(75) Inventor: Andrew Lowry, Ardsley, NY (US)

(73) Assignee: Morgan Stanley, New York, NY (US)

( * ) Notice: Subject to any disclaimer, the term of this patent is extended or adjusted under 35 U.S.C. 154(b) by 1085 days.

(21) Appl. No.: 11/528,721

(22) Filed: Sep. 27, 2006

(65) Prior Publication Data
US 2007/0099157 A1 May 3, 2007

Related U.S. Application Data

(60) Provisional application No. 60/721,317, filed on Sep. 27, 2005.

(51) Int. Cl.
G09B 19/00 (2006.01)
(52) U.S. Cl. ................. 434/118; 705/7.12; 705/7.13
(58) Field of Classification Search ............. 434/118, 434/219; 706/45, 47; 705/8, 7.12, 7.13
See application file for complete search history.

(56) References Cited

U.S. PATENT DOCUMENTS

| 6,415,259 | B1* | 7/2002 | Wolfinger et al. ........... 705/8 |
|---|---|---|---|
| 7,392,210 | B1* | 6/2008 | MacKay et al. ........... 705/35 |
| 7,516,137 | B1* | 4/2009 | Earle et al. ............. 707/100 |
| 7,606,745 | B1* | 10/2009 | Brumfield et al. ......... 705/34 |
| 2002/0040304 | A1* | 4/2002 | Shenoy et al. ............ 705/1 |
| 2003/0050997 | A1* | 3/2003 | Hickey et al. ........... 709/217 |
| 2003/0069869 | A1* | 4/2003 | Gronau et al. ........... 706/46 |
| 2003/0172010 | A1* | 9/2003 | Butani et al. ............ 705/29 |
| 2003/0220891 | A1* | 11/2003 | Fish ..................... 707/1 |
| 2004/0243631 | A1* | 12/2004 | Walker et al. .......... 707/104.1 |
| 2005/0055253 | A1* | 3/2005 | Sahni et al. .............. 705/7 |
| 2005/0114243 | A1* | 5/2005 | Scumniotales et al. ..... 705/35 |
| 2005/0243985 | A1* | 11/2005 | Clark et al. ............ 379/122 |
| 2006/0005181 | A1* | 1/2006 | Fellenstein et al. ....... 717/174 |
| 2006/0167725 | A1* | 7/2006 | Grunspan et al. .......... 705/5 |
| 2007/0006278 | A1* | 1/2007 | Ioan Avram et al. ........ 726/1 |

FOREIGN PATENT DOCUMENTS
EP 0 237 680 A2 9/1987

OTHER PUBLICATIONS

Harrison, T. H. et al., "The Design and Performance of a Real-Time CORBA Event Service," ACM Sigplan Notices, ACM, Association for Computing Machinery, New York, NY, US, vol. 32, No. 10, Oct. 1997, pp. 184-200, XP000723422 ISSN: 0362-1340 (whole document).
Stevens, P., "Implementation of the CORBA Event Service in Java", Thesis submitted to the University of Dublin, Trinity College, in fulfillment of the requirements for the degree of Masters of Science, Sep. 1998, XP002337935, p. 18-24, p. 26, pp. 38-43, pp. 45-48.
Gamma, E. et al., "Design Patterns (Mediator Pattern)", 1995, Addison Wesley Longman, Inc., XP002415363, pp. 273-282.
Written Opinion for PCT/US2006/037652, Feb. 5, 2007 (8 pages).
Van der Aalst, et al., "Workflow Patterns," Distributed and Parallel Databases, 14, 5-51, 2003, Kluwer Academic Publishers, 2003.

* cited by examiner

Primary Examiner — Xuan Thai
Assistant Examiner — Bruk Gebremichael
(74) Attorney, Agent, or Firm — K&L Gates LLP

(57) ABSTRACT

A milestone manager receives a milestone message from a first application. The milestone message includes information associated with a periodic event. The milestone manager applies a rule based process on the milestone message information and sends a trigger to a second application in response to the milestone. The trigger initiates processing of the second application in response to the milestone.

25 Claims, 6 Drawing Sheets

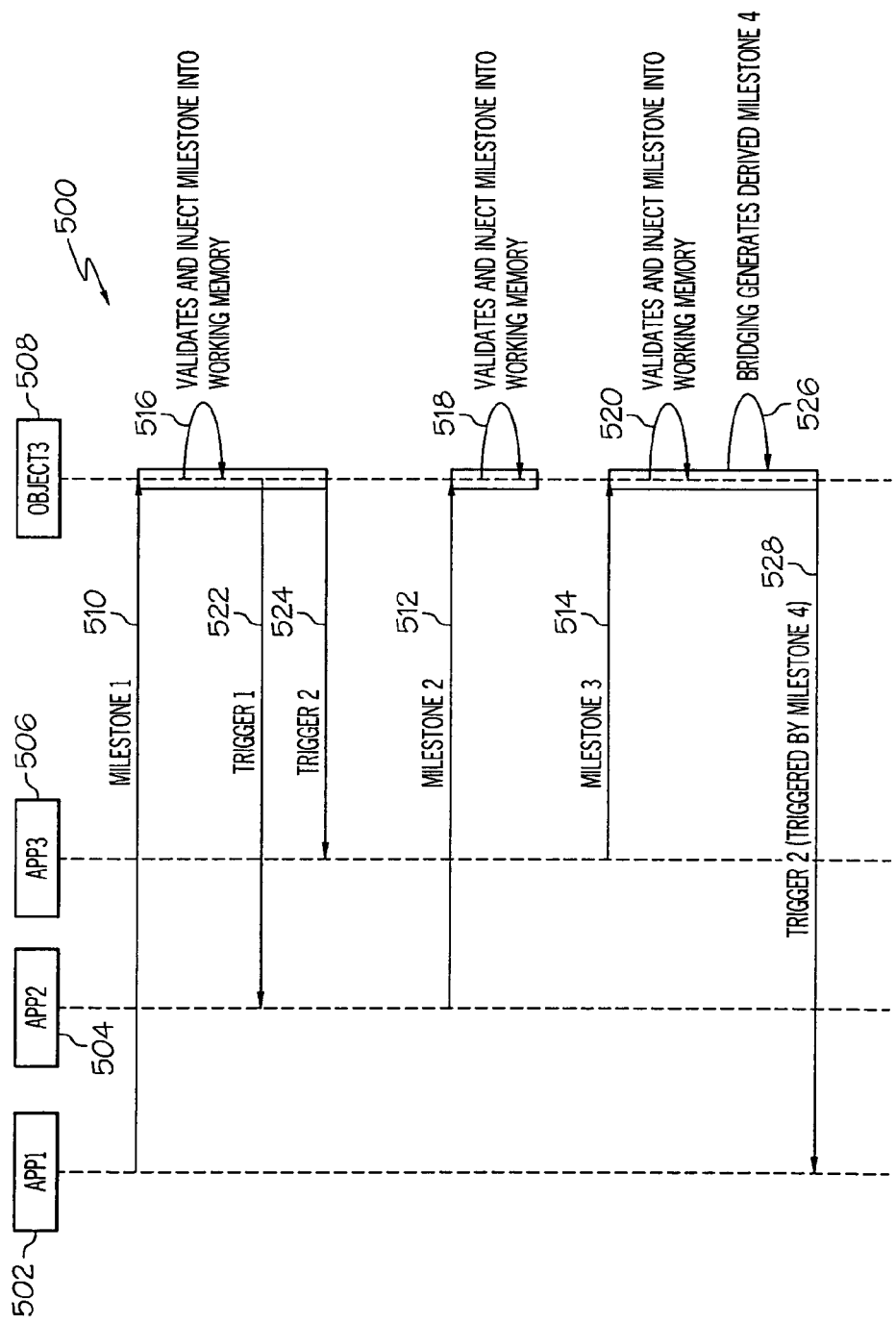

MILESTONE MANAGER

CROSS-REFERENCE TO RELATED APPLICATION

This application claims the benefit of U.S. Provisional Patent Application Ser. No. 60/721,317, entitled "MILESTONE MANAGER," and filed Sep. 27, 2005, the specification for which is hereby incorporated by reference.

FIELD OF THE INVENTION

The present invention generally relates to coordinating and managing the processing activity of computer applications, and more particularly to computer applications forming part of a distributed computing environment.

BACKGROUND

Traditional financial processing systems are generally implemented on mainframe batch processing architectures. There may be many benefits to be realized by converting these processing systems from mainframe batch processing to distributed computer architectures. With long-running applications capable of receiving real-time processing instructions in the form of messages, distributed networks can process tasks with more autonomy and efficiency than their mainframe predecessors. It can be a challenge to reconcile the forward-looking approach and independently operating nature of such mainframe architectures, however, with the needs of a financial institution, for example, to account for and reconcile past investment activity. It can be particularly difficult to apply dependency tracking to applications in such mainframe architectures.

SUMMARY

In one embodiment, a milestone manager receives a milestone message from a first application. The milestone message includes information associated with a periodic event. The milestone manager applies a rule based process on the milestone message information and sends a trigger to a second application in response to the milestone. The trigger initiates processing of the second application in response to the milestone.

BRIEF DESCRIPTION OF THE DRAWINGS

FIG. 5 illustrates a diagram of one embodiment of a milestone/trigger interaction sequence.

DESCRIPTION

Figure 1:
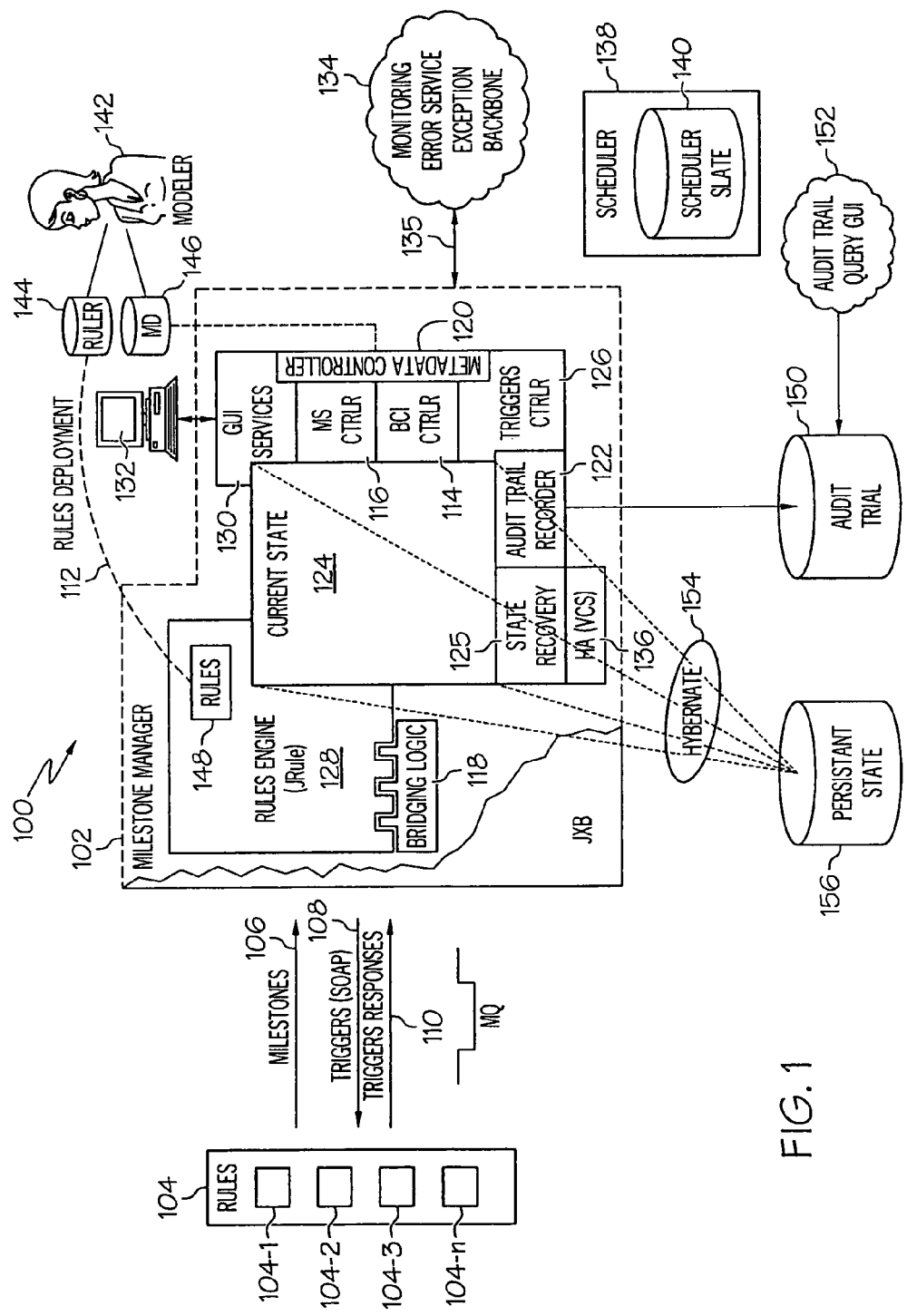
FIG. 1 illustrates one embodiment of a computer system.

FIG. 1 illustrates one embodiment of a computer system 100. Embodiments of the present invention provide a milestone manager 102 ("MM") which may be embodied as the computer system 100 to coordinate and manage the activities of one or more other computer applications 104 (e.g., applications 104-1, 104-2, 104-3 . . . 104-n, where "n" is any positive integer) in a distributed computing environment. The MM 102 may comprise a processor and may interact with these other applications 104-n by way of structured messages that carry "milestone" and "trigger" information, where the milestone information may comprise one or more milestones 106, and the trigger information may comprise one or more triggers 108 and trigger responses 110.

A milestone 106 (e.g., a milestone message) is an assertion that one of the particular applications 104-n has reached a specific point in its daily (or other periodically scheduled) processing. The milestone 106 may be designed around business events or processes. The milestone 106 may comprise information associated with a periodic event. The milestone 106 may have name/value attributes. Attributes may be part of a key (e.g., a date). Attributes may be hierarchical (e.g., location). For example, an order entry from the application 104-1 may send the milestone 106 to the MM 102 to signal when the computer system 100 is taken down for the day (i.e., no more orders will be accepted for that day). In one embodiment, the milestone 106 is an assertion that a particular point in a "Business Cycle Instance" (BCI) has been reached. Generally, the milestone 106 may be tied to a particular platform of one of the applications 104-n having completed a particular task or set of tasks. The milestone 106 may relate to external or manual events. The milestone 106 may be asserted when trading has closed on the stock exchange (e.g., the New York stock Exchange or NYSE) for a given date, when a server application (e.g., a LIBRA server application, for example) has closed the books for accounts in a particular location (e.g., Toronto) for a given date, for example. Also, the milestone 106 may be asserted when controllers have signed off on profits and losses for a given date or when year-end adjustments are complete for a given year.

Figure 2:
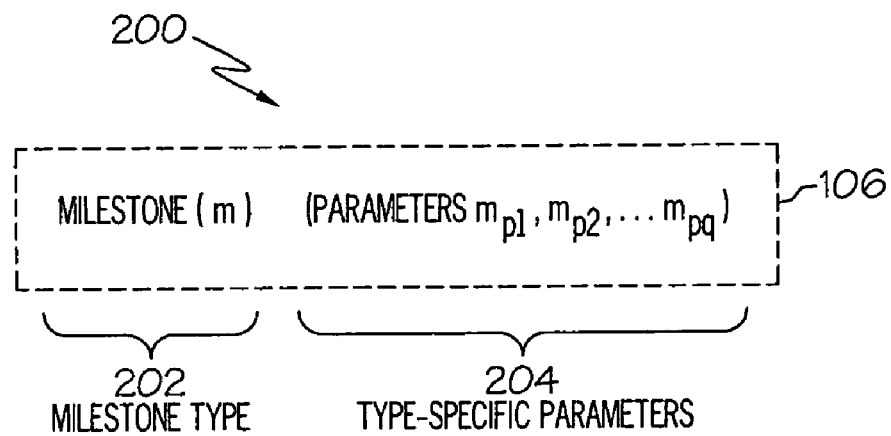
FIG. 2 illustrates one embodiment of a milestone message structure.

Turning briefly to FIG. 2 where one embodiment of a milestone message structure 200 is illustrated. In one embodiment, the milestone 106 may be represented in the milestone message structure 200 including a "milestone type" 202—designated by a name "m"—and zero or more named of the parameters 204, e.g., $m_{p1}$, $m_{p2}$ . . . $m_{pq}$, appropriate for the milestone type 202, where q is any positive integer. Examples of the parameters 204 may comprise location, rate, type of trade, etc. Every one of the milestone types 202 and the parameters 204 associated therewith may appear as a "milestone definition" in the metadata store 146 of the MM 102. The MM 102 may reject any of the milestones 106 that do not match such a definition.

Turning back to FIG. 1, a trigger 108 is a notification from the MM 102 to one of the applications 104-n that one of the applications 104-n should now perform a particular action. In one embodiment, the trigger 108 may be a request by the MM 102, sent to one of the applications 104-n, to perform a particular action. The trigger 108 also may have attributes. These attributes may be taken mostly from the milestones 106 triggering them. For example, the MM 102 may send the trigger 108 indicating that it is now time to generate a particular set of daily reports. In one embodiment, the trigger 108 may be an instruction directing one of the applications 104-n to perform a particular task or effect a state change. For example, the trigger 108 may produce plugs to prevent transparent bridge/source routing (TB/SR) breaks for a given date. The trigger 108 may begin sending new settlement instructions to a particular agent for a given date, compute valuations for foreign exchange (FX) positions for a given date, generate margin statements for a set of accounts for a given date and/or move a server's (e.g., Libra) internal processing date for New York to the next date.

Figure 3:
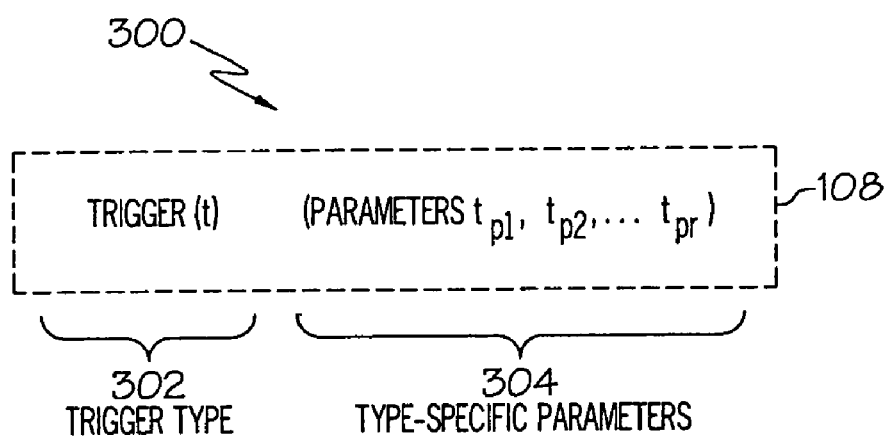
FIG. 3 illustrates one embodiment of a trigger message structure.

Turning briefly to FIG. 3 where one embodiment of a trigger structure 300 is illustrated. In one embodiment, like the milestone 106, the trigger 108 may be represented by the structure 300. The trigger 108 may be represented by the structure 300 including a "trigger type" 302—designated by a name "t"—and zero or more named parameters 304, e.g., $t_{p1}, t_{p2} \ldots t_{pr}$, appropriate for the trigger type 302, where r is any positive integer. The trigger 108 carries the associated named parameters 304 according to a definition appearing in the MM 102 metadata.

Turning back to FIG. 1, the milestones 106 and the triggers 108 may appear in the context of a specific BCI, according to a "Business Cycle" that is part of the definition of the milestone 106 and/or the trigger 108. A business cycle defines a schedule of periods of time, and each such period is a BCI of that business cycle. A business cycle may be a recurrent (e.g., daily) collection of related events. A business cycle enables purging of the milestones 106 and the triggers 108 for completed cycles. A business cycle may have a business cycle instance identifier attribute (e.g., date for a daily cycle), an initiating milestone and a terminating milestone. For example, a daily business cycle may be defined to include each calendar day as an instance, beginning at midnight in a given time zone and ending at the following midnight. Each date would then correspond to a BCI within that cycle. A different daily cycle may be defined in which BCI boundaries correspond to specific points in a processing system—e.g., completion of processing of the trades for the day—rather than according to a particular wall-clock time. Business cycles may be defined at other granularities, e.g., weekly or monthly or annual or any other conceivable schedule, including highly irregular schedules.

Some sample rules are described in the context of the above examples. Along with metadata describing the business cycles, the milestones 106 and the triggers 108 (including the respective attributes), a user 142, e.g., a modeler, defines the rules 148 that define the interactions. The general form may be expressed as:

| | |
|---|---|
| Milestone(s) → send Trigger to applications | (1) |
| Milestone(s) → derive additional milestones | (2) |

In one embodiment, the MM 102 may comprise a BCI controller 114. The BCI controller 114 provides functionality to process a BCI. For example, in various embodiments, the BCI controller 114 may create a new BCI, maintain an active BCI state, answer state queries, writes BCI events to an audit trail recorder 122 and/or audit trail store 150. The audit trail store 150 may be coupled to an audit trail query GUI 152. In various other embodiments, the BCI controller 114 also provides a previous BCI, purges an ended BCI and detects an initiating/terminating BCI. The audit trail recorder 122 records various events. In various embodiments, the audit trail recorder 122 records BCI creation, BCI termination, the milestones 106 assertion, the transmission of the trigger responses 110 and the hold/release of the triggers 108.

In one embodiment, the MM 102 may comprise a milestone controller 116. The milestone controller 116 may be employed to process the milestones 106. For example, the milestone controller 106 may create new milestones, maintain active milestones state, validate milestones, answer state queries, purge milestones from active state, retrieve derived milestones from working memory and write milestones to the audit trail store 150.

In one embodiment, the MM 102 may comprise a bridging logic 118. The bridging logic 118 may be employed to bridge the milestones 106 up or down. The bridging logic 118 may maintain and respond to a bridge up pending list, for example.

In one embodiment, the MM 102 may comprise a metadata controller 120. The metadata controller 120 loads metadata from the metadata store 146 and performs metadata manipulation. The metadata controller 120 validates values within types, validates definitions and responds to metadata queries including, for example, hierarchical queries.

In one embodiment, the MM 102 may comprise an audit trail recorder 122. As previously discussed, the audit trail recorder 122 may be employed to process the milestones 106 and/or the triggers 108, e.g., record the creation and/or termination of BCI, milestone assertion, trigger transmissions, trigger responses and triggers hold/release.

In one embodiment, the MM 102 may be in a certain current state 124. For example, the MM 102 may hold reference to the milestones 106, the triggers 108 and/or any BCI objects in the current state 124. The MM 102 may reconstruct the current state 124 on state recovery 125. The state recovery 125 and other variable may be stored in a persistent state store 156 during hibernation 154.

In one embodiment, the MM 102 may comprise a trigger controller 126. The trigger controller 126 may be employed to create the triggers 108, trigger transmissions and send and resend the transmissions of the triggers 108. The trigger controller 126 also may purge the triggers 108 from active state, match the triggers 108 against all patterns, schedule delayed sends and answer sate queries. In addition, the trigger controller 126 may receive trigger responses 110 and correlate these with the triggers 108 transmissions. The trigger controller 126 may manage the response timeout.

In one embodiment, the MM 102 may comprise a rules engine 128. The rules engine 128 may be employed to apply rules based processing on the milestone 106. In various embodiments, the rules engine 128 may be employed to derive the milestones 106, drive bridging via the bridging logic 118 and create the triggers 108.

In one embodiment, the MM 102 may comprise graphical user interface (GUI) services module 130. The GUI services module 130 may be employed to interface with the MM 102 using graphical images and widgets in addition to text to represent information and actions available to the user 142. The GUI services module 130 may support manual interventions by the user 142. The manual interventions may be employed to accommodate computer system outages and other exceptional conditions that would delay or disrupt normal daily flow of information. The GUI services module 130 respond to state queries and respond to metadata queries. The GUI services module 130 also may stream state changes by subscription. In one embodiment, the MM 102 also may comprise a GUI 132 based interface for manual intervention by the user 142. The GUI 132 may show changes in the current state 124 dynamically via visualization and provides a query interface to the audit trail store 150.

In one embodiment, the MM 102 may interface to a monitoring module error service exception backbone 134. The monitoring module may interface the MM 102 to the error service exception backbone 134 for processing errors via link 135. This interface may enable the MM 102 to detect late milestones, publish metrics and provide an adaptive generation of milestones deadlines.

In one embodiment, the MM 102 may comprise a high availability module 136. The high availability module 136 may provide requirements to start, stop and detect failures.

In one embodiment, the MM 102 may comprise a scheduler 138. The scheduler 138 may be referred to as a delay component, for example. The scheduler 138 may be employed to delay a message. The scheduler 138 comprises a scheduler state store 140.

In one embodiment, the MM 102 may be driven by the rules 148. In one embodiment, the rules 148 may be implemented as an extensible set of business rules, for example. The rules 148 may fire or be deployed when the milestones 106 or combinations of the milestones 106 are asserted. The rules 148 may assert one or more new derived milestones or send one or more triggers.

In one embodiment, the MM 102 may comprise a rule facility in which the rules 148 become eligible for firing or deployment 112 according to a set of the milestones 106 that have been asserted in a particular BCI. The rules 148 may be stored in a rules store 144, for example. When any one of the rules 148 is deployed 112, any or all of the following may occur as a result. New milestones may be asserted, with any of the milestone types 202 (FIG. 2) required and with the parameters 204 (FIG. 2) copied or computed from those of the milestones 106 that caused the rule 148 to match. These "derived milestones" become part of the current state 124 of the MM 102 and are treated exactly the same as the milestones 106 received from any of the applications 104-*n*. The milestones 106 may be asserted into the same BCI as that which contains the matching milestones, or into another (perhaps new) BCI. The triggers 108 that are new may be sent to any of the applications 104-*n*. As with derived milestones, the generated triggers may be any desired of the trigger type 302 (FIG. 3), and the named parameters 304 (FIG. 3) corresponding thereto may be copied or otherwise computed from those of the milestones 106 that match. The trigger 108 is always sent for the BCI to which the milestones 106 that match belong.

In one embodiment, the MM 102 may comprise any one of the milestones 106 derived by means of the "bridging" logic 118 mechanism that exploits the parameters 204 (FIG. 2) that are hierarchical in nature. For example, consider the following "location" hierarchy shown in TABLE 1. The following hierarchy is arranged as a global-regional-local location hierarchy. The global level comprises all locations within continents. The regional comprises locations within continents. The local level comprises countries within the continents.

TABLE 1

| GLOBAL | REGIONAL | LOCAL |
| --- | --- | --- |
| Global | North America | New York |
|  |  | Toronto |
|  |  | San Francisco |
|  | Europe | London |
|  |  | Paris |
|  |  | Zurich |
|  | Asia | Tokyo |
|  |  | Hong Kong |
|  |  | Singapore |
|  |  | Mumbai |

Figure 4A:
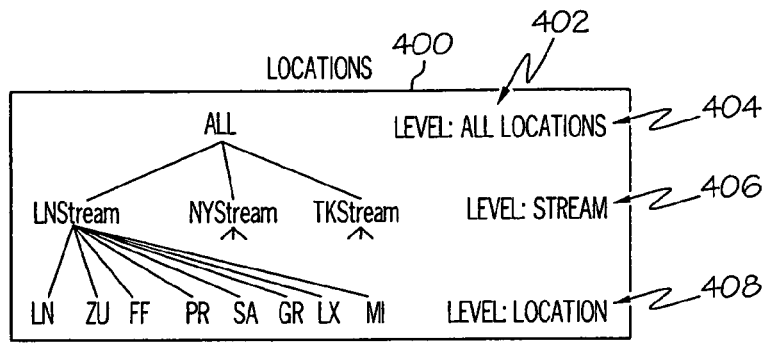
FIG. 4A illustrates one embodiment of a processing location based hierarchy.
Figure 4B:
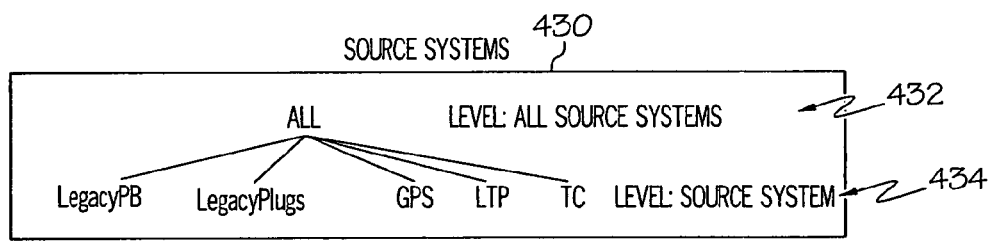
FIG. 4B illustrates one embodiment of a source system based hierarchy.
Figure 4C:
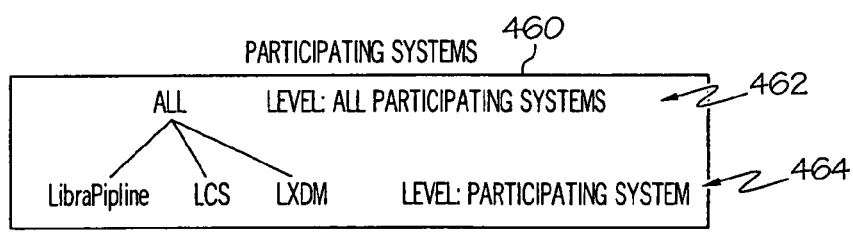
FIG. 4C illustrates one embodiment of a participating system based of hierarchy.

FIGS. 4A, 4B and 4C illustrate several embodiments of hierarchical based structures. The hierarchy may be determined on the basis of one or more hierarchical parameters and/or attributes, such as, for example, processing location, source system, participating system and the like.

FIG. 4A illustrates one embodiment of a processing location based hierarchy 400. The processing location based hierarchy 400 may be structured according to various levels 402 or domains. The illustrated embodiment the "All" level 404 as the name implies has the highest rank and includes all the processing locations. The next level down in the processing location based hierarchy 400 is the stream level 406. The stream level 406 may comprise a London processing stream (LNStream), a New York processing stream (NYStream) and a Tokyo processing steam (TKStream). The next level down in the processing location based hierarchy 400 is the processing location level 408. In the illustrated embodiment, the processing locations of London (LN), Zurich (ZU), Frankfurt (FF), South Africa (SA), Greece (GR), Luxembourg (LX) and Milan (MI) all feed to the London stream LNStream level in the processing location based hierarchy 400.

In this context, a milestone may be derived using upward bridging as follows. Assuming any of these milestones 106 are asserted: (1) ProcessingComplete(TC, LN, 2005-08-01); (2) ProcessingComplete(TC, ZU, 2005-08-01); (3) ProcessingComplete(TC, SA, 2005-08-01); and (4) ProcessingComplete(TC, FF, 2005-08-01). The derived milestone via upward bridging is: ProcessingComplete(TC, LNStream, 2005-08-01). A derived milestone may be a no-op if it has already been asserted otherwise.

Still in this context, a milestone may be derived using downward bridging as follows. Assuming any one of these milestones 106 are asserted:
ProcessingComplete(TC, LNStream, 2005-08-01). The derived milestones via downward bridging are: (1) ProcessingComplete(TC, LN, 2005-08-01); (2) ProcessingComplete (TC, ZU, 2005-08-01); (3) ProcessingComplete(TC, SA, 2005-08-01); and (4) ProcessingComplete(TC, FF, 2005-08-01). The derived milestone via upward bridging is: ProcessingComplete(TC, LNStream, 2005-08-01). A derived milestone may be a no-op if it has already been asserted otherwise.

FIG. 4B illustrates one embodiment of a source system based hierarchy 430. As shown, the source system based hierarchy 430 is ranked based on the type of processing system. Accordingly, the highest rank is an all source system level 432 and the next level rank is the source system system level 434, e.g., LegacyPB, LegacyPlugs, GPS, LTP, TC and the like.

FIG. 4C illustrates one embodiment of a participating system based hierarchy 460. As shown, the participating system based hierarchy 460 is ranked based on the participating processing system. Accordingly, the highest rank is all participating processing systems level 462 and the next level rank is a participating processing system level 464, e.g., LibraPipeline, LCS, LXDM and the like.

Now imagine an "OrderEntryComplete" as the milestone 106 that includes two of the parameters 204 (FIG. 2): a location parameter "New York" and a date parameter "Sep. 23, 2005." Accordingly, a milestone type "OrderEntryComplete" with these two parameters may be expressed as, e.g., "OrderEntryComplete("New York", Sep. 23, 2005). This may be a milestone asserting that order entry is complete for the New York location for Sep. 23, 2005, for example.

"Downward Bridging" may occur when one of the milestones 106 is asserted that includes a hierarchical parameter with a value that is not at the lowest level in the hierarchy. New milestones may be derived from this milestone, one for each "child" of the hierarchical attribute value that appears in the incoming milestone. Each of the derived milestones is identical to the incoming milestone except in the value of that hierarchical parameter. For example, if a milestone OrderEntryComplete("North America", Sep. 23, 2005) were asserted, downward bridging would cause the following milestones all to be asserted: (1) OrderEntryComplete("New York", Sep. 23, 2005); (2) OrderEntryComplete("Toronto", Sep. 23, 2005); and (3) OrderEntryComplete("San Francisco", Sep. 23, 2005).

These derived milestones would be treated just like any other asserted milestone; in particular, if further bridging were possible from any of them, it would occur. "Upward Bridging" occurs when several of the milestones 106 have been asserted that are identical except for the values of some specific hierarchical attribute, and the values cover all the children of a particular value in the hierarchy. In this case, a single new milestone corresponding to that parent value, but otherwise identical to the other milestones, is derived and asserted. For example, suppose the following three milestones have been asserted: (1) OrderEntryComplete("North America", Sep. 23, 2005); (2) OrderEntryComplete("Europe", Sep. 23, 2005); and (3) OrderEntryComplete("Asia", Sep. 23, 2005).

The MM 102 may be employed to derive and assert the milestone OrderEntryComplete("Global", Sep. 23, 2005) by means of upward bridging. Upward and downward bridging may support a broad range of useful use cases of the derivation of the milestones 106 without the need for explicit rules, and thus permit rule bases to be smaller, simpler and easier to maintain.

For example, assume a hierarchical structure has element "y" as the highest ranked element in the structure and has elements "y1" and "y2" ranked at a lower level than element "y" in the hierarchical structure. In the following examples, the letter "A" represents an assertion and the letter "D" represents a derivation.

One example of bridge-down technique may be illustrated as:

| | |
|---|---|
| A(x, y, z) | (3) |
| D(x, y1, z) | (4) |
| D(x, y2, z) | (5) |

One example of bridge-up technique may be illustrated as:

| | |
|---|---|
| A(x, y1, z) | (6) |
| A(x, y2, z) | (7) |
| D(x, y, z) | (8) |

The MM 102 supports a number of manual interventions to permit operations personnel to manage the overall operation of the distributed facility. These manual interventions may comprise, for example, manual assertion, trigger hold, trigger release, trigger hold pattern revocation and trigger resend.

The manual assertion is a manual intervention that may be employed if one of the applications 104-$n$ that normally would assert any one of the milestones 106 has failed or is delayed in its processing. Accordingly, that failed or delayed milestone may be asserted manually by an appropriately permissioned operator. The manual assertion permits dependent triggers to be generated so that downstream processing can be initiated.

The trigger hold is another manual intervention. An operator may create a "hold pattern" so as to prevent certain ones of the triggers 108 from being sent when they are generated. This might be important if, for reasons not visible to the MM 102, some downstream processing system is not prepared to act on the trigger 108 that it would normally receive. When the trigger 108 is generated, it is sent only if it does not match any currently active hold patterns. Otherwise it is held by the MM 102 until such time as the hold pattern is revoked, or the trigger 108 is individually released.

The trigger release is a manual intervention wherein the trigger 108 that is being held because it matched a hold pattern may be released. This will cause the MM 102 to send the trigger to its intended recipient. Other triggers matching the same hold pattern will not be released in such a case.

The trigger hold pattern revocation is a manual intervention wherein a previously established hold pattern may be revoked. This will cause all triggers held by that pattern to be matched against any remaining hold patterns still in effect, and any trigger that no longer matches a hold pattern will be sent to its intended target application.

The trigger resend is a manual intervention wherein a trigger that was previously sent and received by one of the target applications 104-$n$ may be manually resent. This might be useful, e.g., to cause a report that is found to be erroneous to be regenerated once incorrect input data has been corrected.

The MM 102 may be configured to maintain a comprehensive audit trail store 150 of all the milestones 106 asserted, the triggers 108 sent, and any manual interventions performed.

A set of the milestones 106 asserted to and the triggers 108 sent from the MM 102 for a given BCI constitute a unique view into the overall progress of the distributed processing system for the BCI. The MM 102 supports both query interfaces and a publishing facility to permit monitoring systems to present this information to operations and support personnel.

In general, the MM 102 knows how to start jobs, detect when jobs are completed and knows whether jobs are worked or not. Based on this information, the MM 102 can initiate additional jobs in the distributed computing environment. The MM 102 is not oriented around mere job starting and stopping, however; it is oriented around messages being communicated to coordinate behavior of the applications 104-$n$. The MM 102 also may be involved with processing message information instead of merely detecting or causing discrete start or stop events. For example, the message from one of the applications 104-$n$ may let the MM 102 know that the job has started, that one of the applications 104-$n$ has reached the end of trade entry for the New York location for a particular type of trade, that the trading occurred on a particular date, e.g., Sep. 28, 2005, and the number of trades processed on that day. This information can be rolled up into the milestone 106 to inform the MM 102 and/or to direct further processing within the distributed environment.

With reference back to FIG. 1, a basic model for the way the MM 102 works with a variety of the applications 104-$n$ involves applications being configured to know when they have reached an important part of their processing cycle. When the applications get to a point that they know is an important point of their processing, the applications can send the milestone 106 message to the MM 102. This is a communication to the MM 102 reflecting that one of the milestones 106 has been reached by one of the applications 104-$n$. The MM 102 consumes the milestone information, may store it away, and may start comparing it to other milestone information that it has received for the same or a different processing cycle. The MM 102 may start making connections and inferences to allow it to derive new milestones. The MM 102 can also derive new milestones based on new business rules. The business rules may tell the MM 102 to instruct one of the applications 104-$n$ to perform a certain piece of its daily processing, for example, and the MM 102 at that point may send the trigger 108 message to one of the applications 104-*n*. From one of the applications 104-*n* point of view, this is easier than keeping track of various correlated data about the state of the world and the state of processing. The applications 104-*n* are primarily responsible to report significant processing activity to the MM 102, such as when an activity has been completed, and to accept and execute instructions received from the MM 102.

The MM 102 may employ "bridging" using the bridging logic 118 in its operations. The bridging logic 118 is where the MM 102 performs automatic aggregations and explosions of the milestones 106 based on hierarchies that are involved in similar parameters. For example, the MM 102 may be told about one of the milestones 106 that pertains to a particular location, e.g., a city such as San Francisco, for example, and San Francisco rolls up to a region, e.g., the North American region, for example. After the milestone for San Francisco is received, the same milestone may be received for other locations: New York, Los Angeles, Chicago, and other cities that constitute the North American region, for example. The MM 102 can, without having a rule to tell itself to do this, derive the same milestone for the North American region. This is a valuable tool in that it allows aggregating information to determine the processing status of different locations or trading desks, for example, whatever the hierarchy might involve. Likewise, if the milestone 106 is asserted for the North American region, for example, the same milestone can be derived for each city in the region.

For example, there may be two applications, a first application called trade completion and a second application called LIBRA, for example, and both deal with things on a location level, but trade completion operates naturally at one level of granularity deeper than LIBRA and the location of hiring. So LIBRA does not concern itself with trade completion finishing for a particular company code; it wants to know when trade completion is finished for all the company codes that constitute the Frankfort location, for example. This bridging is a way for trade completion and the London Interbank Offered Rate (LIBOR) both to express their own logic in the way that is most natural to them. And the MM 102 with its bridging logic 118 can take in milestones at a company-code level and turn them into milestones at the location level, without having pre-existing rules instructing it to do so.

The MM 102 also has the capability to accommodate manually entered interventions. Suppose there is a daily cycle involving LIBRA, for example, closing its books each day generally some time around 11:00 p.m. or 11:30 p.m. at night, New York time. Suppose that one day trade completion is in an awful state, unable to process anything, and the best estimate is that the system will not be able to finish processing its work for the day before 4:00 a.m. in the morning. It would be an unacceptable situation if LIBRA had to wait until 4:00 a.m. in the morning to start its processing: essential reports would not be ready for start of business the next day. What can be done in this situation is to proceed as if trade completion has finished. This can be accomplished by allowing the MM 102 to receive an intervention wherein one of the milestones 106 normally sent by trade completion is asserted manually at a different time (e.g., midnight), and the MM 102 will not wait for trade completion. Once the milestone 106 is asserted, it acts just as if it had come from trade completion, and whatever was waiting for trade completion to finish can be released by the fact that the milestone 106 was entered manually, and everything will proceed accordingly. The MM 102 can capture the fact that it was a manually inserted milestone, not one that came through the normal course of processing; this can be done for subsequent audit purposes.

Other examples of interventions include putting the triggers 108 on hold, so that even though all prerequisites may have been met for a particular action to be triggered by the MM 102, a hold may be placed on the trigger 108. The hold prevents the MM 102 from initiating the trigger 108, and the MM 102 holds the action in abeyance until the hold is released. There is also a way of doing trigger holds by matching triggers against patterns that are put in place by operations personnel. For example, a hold pattern can be instituted for the trigger 108 whose function is to start reports, and a location parameter can be wild carded. The hold pattern prevents any "start reports" triggers from being sent. The patterns may be revoked so that the triggers 108 in the pattern can be released, or only specific triggers may be released from the pattern. The triggers 108 can also be re-submitted if, for instance, processing one of the applications 104-*n* in the computing environment halts for some reason.

FIG. 5 illustrates a diagram of one embodiment of a milestone/trigger interaction sequence 500. One or more applications such as first, second and third applications 502, 504, 506 interact with an object 508 via corresponding milestones and triggers. In the illustrated embodiment, the first application 502 asserts a first milestone 510 that the first application 502 has reached a specific point in its periodic processing. Similarly, the second and third applications 504, 506 assert corresponding second and third milestone 512, 514 that the second and third applications 504, 506 have reached specific point in their periodic processing. The object 508 validates and injects 516, 518, 520 the corresponding first, second and third milestones 510, 512, 514 in memory. The first milestone 510 triggers a first trigger 522 from the object 508 to the second application 504. The first milestone 510 triggers also trigger a second trigger 524 to the third application 506. In response to the third milestone 514, the object 508 generates 526 a derived fourth milestone, which triggers a third trigger 528 (triggered by a fourth milestone, for example) to the first application 502. The embodiments are not limited in this context.

Figure 6:
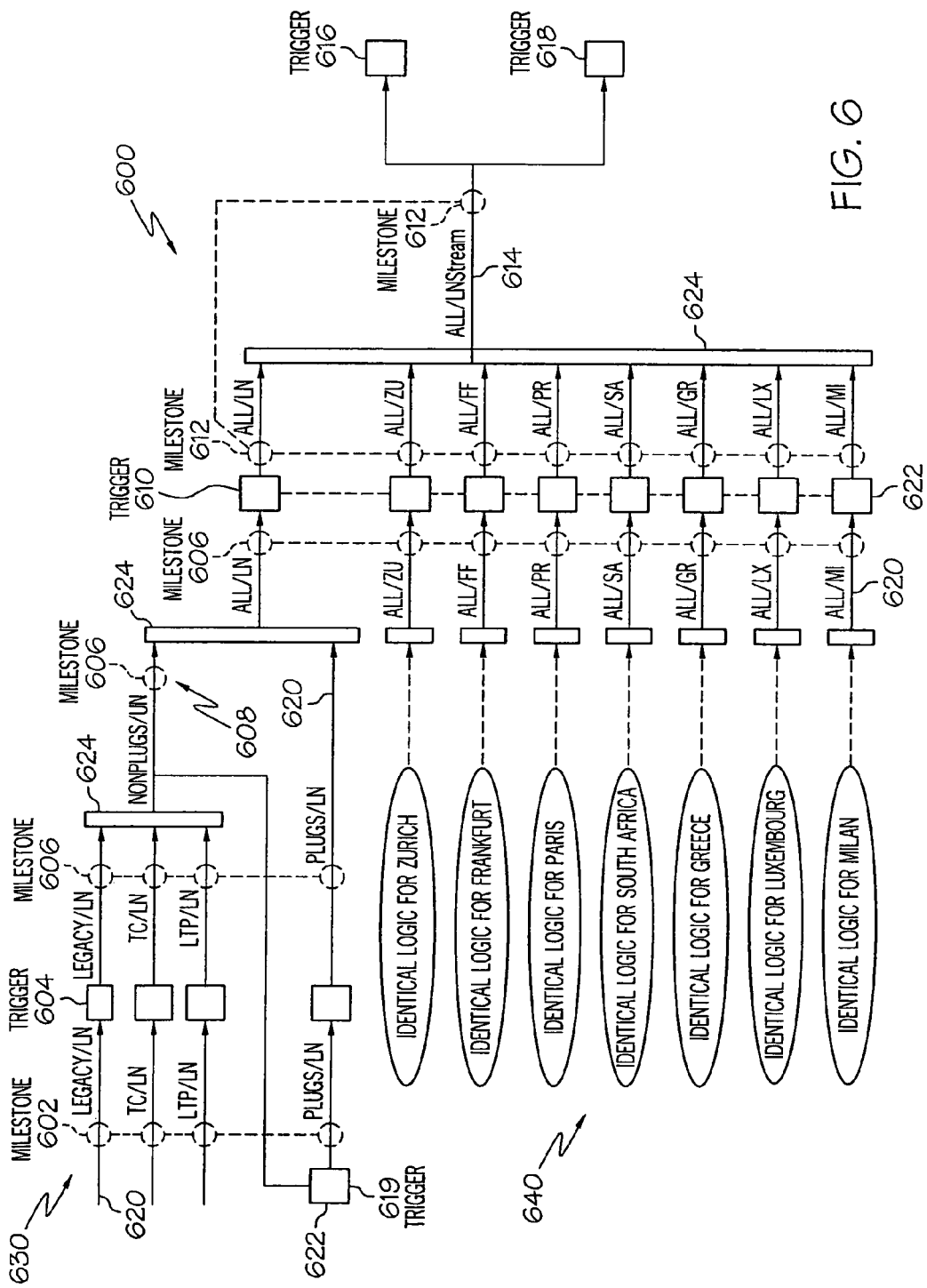
FIG. 6 illustrates one embodiment of a flow diagram employing a milestone manager as shown in FIG. 1.

FIG. 6 illustrates one embodiment of a flow diagram 600 employing the MM 102 (FIG. 1). The flow diagram 600 is one example of an end-of-day process from a source location 630. The source location 630 may be representative of the London (LN) location (LN FIG. 4A) feeding into the LNStream (FIG. 4A). The same logic may be applied to the other source locations 640, e.g., Zurich (ZU), Frankfurt (FF), Paris (PR), South Africa (SA), Greece (GR), Luxembourg (LX) and Milan (MI). In the flow diagram 600 generally, milestones are represented as arrows 620, triggered actions are represented as squares 622 and bridging is represented by vertical bars 624.

The flow diagram 600 illustrates an end-of-day process wherein all systems for the source location 630 send a milestone 602 when they have sent all messages to the server application (e.g., a LIBRA server application). A trigger 604 causes the server application to make sure all events from the given source location 630 have been fully processed. The server application issues another milestone 606 as each source system check succeeds. When all non-Plugs source systems are complete, plugs processing 608 is initiated for that location. When all source systems (including Plugs) are complete for a given source location 630, 640, another trigger 610 tells the server application to make sure that there are no errors outstanding for the source location 630, 640. Another milestone 612 is issued by the server application each time the source location 630, 640 is complete and error-free. When the milestone 612 is achieved for the stream 614 associated with the source locations 630, 640, two triggers 616, 618 are issued. The first trigger 616 kicks off or initiates one action for the stream 614 (e.g., PB Extract creation) and the second trigger 618 kicks off or initiates another action for the stream 614 (e.g., Journal Extract creation). The embodiments are not limited in this context.

Figure 7:
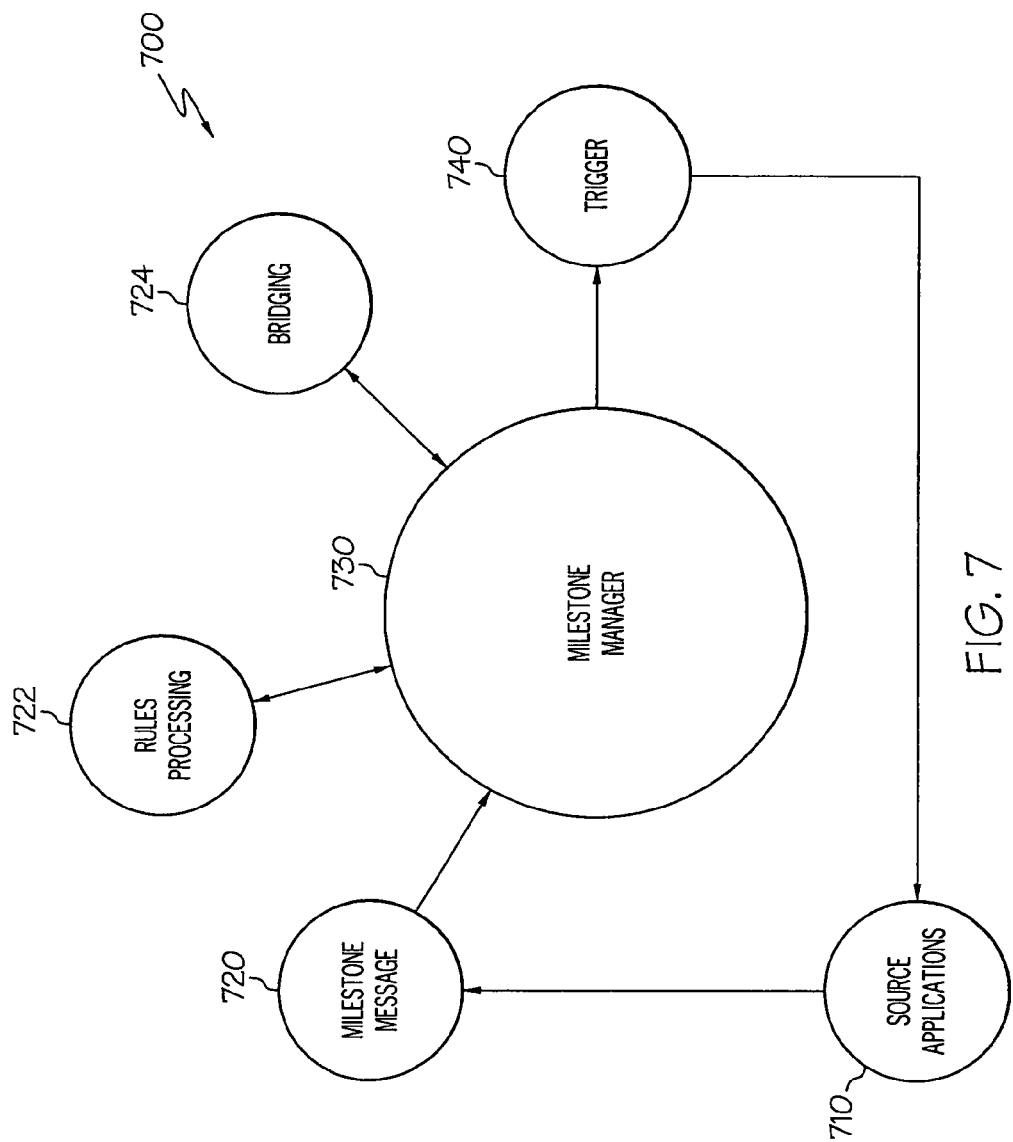
FIG. 7 illustrates a flow diagram of one embodiment of a milestone manager based service oriented system.

FIG. 7 illustrates a flow diagram of one embodiment of a milestone manager based service oriented system 700. One or more of the source applications 710 ($a_1$, $a_2$ ... $a_p$) represent long lived ongoing processes and may be particular platform applications. The source applications 710 may issue a milestone 720 when a particular point has been reached in a predetermined business cycle. As previously described, the milestone 720 comprises a message comprising structured information. The milestone manager 730 receives the milestone 720. The milestone 720 informs the milestone manager 730 that something significant has occurred with respect to the source applications 710 processing. The milestone manager 730 applies rules based processing 722 on the information contained in the incoming milestone 720 to determined which one of the one or more triggers 740 to issue. In addition, the milestone manager 730 may perform bridging 724 on several incoming milestones. As previously discussed, bridging is an aggregation of milestone information according to a natural hierarchy, such as, for example, a location based hierarchy (e.g., global—regional—local hierarchy). The milestone manager 730 may retrieve the hierarchy information from a location database, for example. The milestone manager 730 issues the triggers 740. The triggers 740 may be issued to one or more of the source applications 710 and not necessarily to the particular application that issued the milestone 720. The triggers 740 also may comprise a message comprising structured information. The triggers 740 may initiate the execution of some action in response to the issuance of the milestone 720. The embodiments are not limited in this context.

The examples presented herein are intended to illustrate potential and specific implementations of the present invention. It can be appreciated that the examples are intended primarily for purposes of illustration of the invention for those skilled in the art. No particular aspect or aspects of the examples is/are intended to limit the scope of the present invention.

It is to be understood that the figures and descriptions of the present invention have been simplified to illustrate elements that are relevant for a clear understanding of the present invention, while eliminating, for purposes of clarity, other elements. For example, certain operating system details and modules of network platforms are not described herein. Those of ordinary skill in the art will recognize, however, that these and other elements may be desirable in a typical processor, computer system or e-mail application, for example. However, because such elements are well known in the art and because they do not facilitate a better understanding of the present invention, a discussion of such elements is not provided herein.

Any element expressed herein as a means for performing a specified function is to encompass any way of performing that function including, for example, a combination of elements that perform that function. Furthermore the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware which may be used to implement embodiments of the invention is not limiting. For example, embodiments described herein may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. The operation and behavior of the invention embodiments may be described without specific reference to specific software code or specialized hardware components. The absence of such specific references is feasible, because it is clearly understood that artisans of ordinary skill would be able to design software and control hardware to implement the embodiments of the present invention based on the present description with no more than reasonable effort and without undue experimentation.

Moreover, the processes associated with the present embodiments may be executed by programmable equipment, such as computers or computer systems. Software that may cause programmable equipment to execute processes may be stored in any storage device, such as, for example, a computer system (non-volatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a carrier wave modulated, or otherwise manipulated, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary. A computer-readable medium may further include one or more data signals transmitted on one or more carrier waves.

A "computer" or "computer system" may be, for example and without limitation, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM), and/or other computer-readable media.

In various embodiments of the present invention disclosed herein, a single component may be replaced by multiple components, and multiple components may be replaced by a single component, to perform a given function or functions. Except where such substitution would not be operative, such substitution is within the scope of the invention. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent that various modifications, alterations and adaptations to those embodiments may occur to persons skilled in the art with attainment of at least some of the advantages of the present invention. The disclosed embodiments are therefore intended to include all such modifications, alterations and adaptations without departing from the scope and spirit of the present invention as set forth herein.

The invention claimed is:

1. A method for managing processing activity of computer applications in a distributed computing environment, comprising:
receiving, by at least one processor, a first milestone message from a first application, the first milestone message comprising milestone information including a milestone type indicator and one or more milestone parameter values, wherein the fist milestone message indicates that the first application has reached a specific point in its periodic processing, and wherein at least one of the milestone parameter values is a first hierarchical attribute value that represents a first element of a hierarchal structure;
bridging down, by the at least one processor, the first milestone message to derive a second milestone message and a third milestone message based at least in part on the first hierarchical attribute value and the hierarchal structure, wherein the second and third milestone messages each correspond to elements of the hierarchal structure that are child elements of the first element according to the hierarchal structure, wherein the second milestone message indicates that a second application has reached a specific point in its periodic processing, and wherein the third milestone message indicates that a third application has reached a specific point in its periodic processing;
applying, by the least one processor, a rule based process on the second and the third milestone message; and
sending, by the at least one processor, a first trigger message and a second trigger message in response to the application of the rule on the second and third new milestone messages.

2. The method of claim 1, comprising receiving a manual intervention to accommodate a computer system outage.

3. The method of claim 1, comprising monitoring incoming milestones messages to detect an occurrence of a late milestone message.

4. The method of claim 1, comprising recording an audit trail for any one of a business cycle instance creation, business cycle instance termination, milestone assertion, trigger transmission with response, trigger hold and trigger release.

5. The method of claim 1, comprising:
creating a business cycle instance;
maintaining active the business cycle instance state; and
detecting initiating or terminating business cycle instances.

6. An apparatus, comprising:
a milestone manager system comprising a processor and a non-transitory computer readable medium having instructions stored thereon which when executed by the processor cause the processor to:
receive a first milestone message from a first application, the first milestone message comprising milestone information including a milestone type indicator and one or more milestone parameter values, wherein the first milestone message indicates that the first application has reached a specific point in its periodic processing, and wherein at least one of the milestone parameter values is a first hierarchical attribute value that represents a first element of a hierarchal structure,
bridge down the first milestone message to derive a second milestone message and a third milestone message based at least in part on the first hierarchical attribute value and the hierarchal structure, wherein the second and third milestone messages each correspond to elements of the hierarchal structure that are child elements of the first element according to the hierarchal structure, wherein the second milestone message indicates that a second application has reached a specific point in its periodic processing, and wherein the third milestone message indicates that a third application has reached a specific point in its periodic processing;
apply a rule based process on the second and the third milestone messages, and
send a first trigger message and a second trigger message in response to the application of the rule on the second and third new milestone messages.

7. The apparatus of claim 6, comprising a graphical user interface services module to receive a manual intervention to accommodate a computer system outage.

8. The apparatus of claim 6, comprising a monitoring module to monitor incoming milestones messages to detect an occurrence of a late milestone messages.

9. The apparatus of claim 6, comprising an audit trail recorder to record an audit trail for any one of a business cycle instance creation, business cycle instance termination, milestone assertion, trigger transmission with response, trigger hold and trigger release.

10. The apparatus of claim 6, comprising a business cycle instance controller to record information associated with creating of a business cycle instance, maintaining active the business cycle instance state, and detecting initiating or terminating business cycle instances.

11. A system, comprising:
a milestone manager system comprising a processor and a non-transitory computer readable medium having instructions stored thereon which when executed by the processor cause the processor to:
receive a first milestone message from a first application, the first milestone message comprising milestone information including a milestone type indicator and one or more milestone parameter values, wherein the first milestone message indicates that the first application has reached a specific point in its periodic processing, and wherein at least one of the milestone parameter values is a first hierarchical attribute value that represents a first element of a hierarchal structure, bridge down the first milestone message to derive a second milestone message and a third milestone message based at least in part on the first hierarchical attribute value and the hierarchal structure, wherein the second and third milestone messages each correspond to elements of the hierarchal structure that are child elements of the first element according to the hierarchal structure, wherein the second milestone message indicates that a second application has reached a specific point in its periodic processing, and wherein the third milestone message indicates that a third application has reached a specific point in its periodic processing;

apply a rule based process on the second and the third milestone messages, and send a first trigger message and a second trigger message in response to the application of the rule on the second and third new milestone messages; and an application server coupled to the milestone manager system, wherein the first application sending the first milestone message is executable by the application server.

12. The system of claim 11, comprising a milestone controller to bridge down the first milestone messages to derive the at least two new milestone messages.

13. The system of claim 11, comprising a graphical user interface services module to receive a manual intervention to accommodate system outage.

14. The system of claim 11, comprising a monitoring module to monitor incoming milestones to detect an occurrence of a late milestone from the application server.

15. The system of claim 11, comprising an audit trail recorder to record an audit trail for any one of a business cycle instance creation, business cycle instance termination, milestone assertion, trigger transmission with response, trigger hold and trigger release.

16. The system of claim 11, comprising a business cycle instance controller to record information associated with creating of a business cycle instance, maintaining active the business cycle instance state, and detecting initiating or terminating business cycle instances.

17. An article comprising a non-transitory computer readable medium having instruction stored thereon, which when executed by a processor cause the processor to:

receive a first milestone message from a first application, the first milestone message comprising milestone information including a milestone type indicator and one or more milestone parameter values, wherein the first milestone message indicates that the first application has reached a specific point in its periodic processing, and wherein at least one of the milestone parameter values is a first hierarchical attribute value that represents a first element of a hierarchal structure, bridge down the first milestone message to derive a second milestone message and a third milestone message based at least in part on the first hierarchical attribute value and the hierarchal structure, wherein the second and third milestone messages each correspond to elements of the hierarchal structure that are child elements of the first element according to the hierarchal structure, wherein the second milestone message indicates that a second application has reached a specific point in its periodic processing, and wherein the third milestone message indicates that a third application has reached a specific point in its periodic processing;

apply a rule based process on the second and the third milestone messages, and send a first trigger message and a second trigger message in response to the application of the rule on the second and third new milestone messages.

18. The article of claim 17, wherein the instructions cause the processor to receive a manual intervention to accommodate a computer system outage.

19. The article of claim 17, wherein the instructions cause the processor to monitor incoming milestones to detect an occurrence of a late milestone.

20. The article of claim 17, wherein the instructions cause the processor to record an audit trail for any one of a business cycle instance creation, business cycle instance termination, milestone assertion, trigger transmission with response, trigger hold and trigger release.

21. The article of claim 17, wherein the instructions cause the processor to create a business cycle instance; maintain active the business cycle instance state; and detect initiating or terminating business cycle instances.

22. The method of claim 1, further comprising:

receiving, by at least one processor, fourth and fifth milestone messages from the first application, the fourth and fifth milestone messages each comprising respective milestone information including a milestone type indicator and one or more milestone parameter values, wherein at least one of the respective milestone parameter values for each of the fourth and fifth milestone messages is a hierarchical attribute value that represents an element of the hierarchal structure;

bridging up, by at least one processor, the fourth and fifth milestone messages to aggregate the fourth and fifth milestone messages and derive an aggregated milestone message based at least in part on the hierarchical attribute values for each of the fourth and fifth milestone messages and the hierarchal structure;

applying, by the least one processor, a rule based process on the aggregated milestone message;

sending, by the at least one processor, a third trigger message to at least one of the first, second, and third applications in response to the application of the rule to the aggregated milestone message, wherein the third trigger message is to initiate processing by the at least one of the first, second, and third applications.

23. The apparatus of claim 6, wherein the non-transitory computer readable medium has instructions stored thereon which when executed by the processor cause the processor to:

receive fourth and fifth milestone messages from the first application, the fourth and fifth milestone messages each comprising respective milestone information including a milestone type indicator and one or more milestone parameter values, wherein at least one of the respective milestone parameter values for each of the fourth and fifth milestone messages is a hierarchical attribute value that represents an element of the hierarchal structure;

bridge up the fourth and fifth milestone messages to aggregate the fourth and fifth milestone messages and derive an aggregated milestone message based at least in part on the hierarchical attribute values for each of the fourth and fifth milestone messages and the hierarchal structure;

apply a rule based process on the aggregated milestone message;

send a third trigger message to at least one of the first, second, and third applications in response to the application of the rule to the aggregated milestone message, wherein the third trigger message is to initiate processing by the at least one of the first, second, and third applications.

24. The system of claim 11, wherein the non-transitory computer readable medium has instructions stored thereon which when executed by the processor cause the processor to:
receive fourth and fifth milestone messages from the first application, the fourth and fifth milestone messages each comprising respective milestone information including a milestone type indicator and one or more milestone parameter values, wherein at least one of the respective milestone parameter values for each of the fourth and fifth milestone messages is a hierarchical attribute value that represents an element of the hierarchal structure;
bridge up the fourth and fifth milestone messages to aggregate the fourth and fifth milestone messages and derive an aggregated milestone message based at least in part on the hierarchical attribute values for each of the fourth and fifth milestone messages and the hierarchal structure;
apply a rule based process on the aggregated milestone message;
send a third trigger message to at least one of the first, second, and third applications in response to the application of the rule to the aggregated milestone message, wherein the third trigger message is to initiate processing by the at least one of the first, second, and third applications.

25. The article of claim 17, wherein the instructions cause the processor to:
receive fourth and fifth milestone messages from the first application, the fourth and fifth milestone messages each comprising respective milestone information including a milestone type indicator and one or more milestone parameter values, wherein at least one of the respective milestone parameter values for each of the second and third fourth and fifth milestone messages is a hierarchical attribute value that represents an element of the hierarchal structure;
bridge up the fourth and fifth milestone messages to aggregate the fourth and fifth milestone messages and derive an aggregated milestone message based at least in part on the hierarchical attribute values for each of the fourth and fifth milestone messages and the hierarchal structure;
apply a rule based process on the aggregated milestone message;
send a third trigger message to at least one of the first, second, and third applications in response to the application of the rule to the aggregated milestone message, wherein the third trigger message is to initiate processing by the at least one of the first, second, and third applications.

* * * * *